(12) United States Patent
Origuchi et al.

(10) Patent No.: US 6,495,628 B1
(45) Date of Patent: Dec. 17, 2002

(54) PROCESS FOR PRODUCING VINYL ACETATE RESIN EMULSION AND WATER-BASED ADHESIVE

(75) Inventors: Toshiki Origuchi, Osaka (JP); Shintaro Ogawa, Osaka (JP)

(73) Assignee: Konishi Co. Ltd., Osaka (JP)

( * ) Notice: Subject to any disclaimer, the term of this patent is extended or adjusted under 35 U.S.C. 154(b) by 0 days.

(21) Appl. No.: 09/647,591

(22) PCT Filed: Feb. 15, 2000

(86) PCT No.: PCT/JP00/00809

§ 371 (c)(1),
(2), (4) Date: Oct. 3, 2000

(87) PCT Pub. No.: WO00/49054

PCT Pub. Date: Aug. 24, 2000

(30) Foreign Application Priority Data

Feb. 18, 1999 (JP) .............................. 11-039360
Jul. 12, 1999 (JP) .............................. 11-198070

(51) Int. Cl.$^7$ .............................................. C08L 29/04
(52) U.S. Cl. .................... 524/803; 524/458; 524/503
(58) Field of Search ................. 524/803, 458, 524/503

(56) References Cited

U.S. PATENT DOCUMENTS 3,769,151 A * 10/1973 Knutson et al.
4,122,136 A   10/1978 Korte et al.
4,164,489 A    8/1979 Daniels et al.
4,226,752 A   10/1980 Erickson et al.
6,001,916 A   12/1999 Walker et al.

FOREIGN PATENT DOCUMENTS

JP        11246630        9/1999

* cited by examiner

Primary Examiner—Tae H. Yoon
(74) Attorney, Agent, or Firm—Birch Stewart Kolasch & Birch LLP

(57) ABSTRACT

A process of the invention produces a vinyl acetate polymer based emulsion by seed polymerization of vinyl acetate in an ethylene-vinyl acetate copolymer based emulsion. This process includes a step of performing seed polymerization while adding vinyl acetate to a system, and, prior to or subsequent to the step, a step of adding a polymerizable unsaturated monomer other than vinyl acetate to the system. The amount of the polymerizable unsaturated monomer other than vinyl acetate is, for example, about 0.05 to 10 parts by weight relative to 100 parts by weight of vinyl acetate. At least one monomer selected from acrylic esters, methacrylic esters, vinyl esters, and vinyl ethers can be used as the polymerizable unsaturated monomer other than vinyl acetate. The invented process can produce a vinyl acetate polymer based emulsion which has satisfactory low-temperature film-forming property and adhesive strength, even containing no plasticizer, and which can exhibit a high adhesive strength even when cured at low temperatures.

6 Claims, No Drawings

PROCESS FOR PRODUCING VINYL ACETATE RESIN EMULSION AND WATER-BASED ADHESIVE

This application is the national phase under 35 U.S.C. §371 of PCT International Application No. PCT/JP00/00809 which has an International filing date of Feb. 15, 2000, which designated the United States of America.

TECHNICAL FIELD

The present invention relates to a process for producing a vinyl acetate polymer based emulsion and to a water based adhesive including the vinyl acetate polymer based emulsion. The vinyl acetate polymer based emulsion is useful as, for example, a paint base and a coating agent, in addition to an adhesive. The water based adhesive is advantageous as a plasticizer-free water based adhesive.

BACKGROUND ART

Vinyl acetate polymer based emulsions have been widely used as, for example, adhesives and paints for woodworking, paper processing, and fiber processing. However, such vinyl acetate polymer based emulsions as intact have high minimum film-forming temperatures, and must be incorporated with film-forming auxiliaries such as volatile plasticizers and organic solvents in many cases. As such plasticizers, phthalic esters and the like are employed. However, these pthalic esters are pointed out that they are environmentally undesired through increasing environmental sensitivities in recent years. The replacement of the ophthalmic esters with, for example, safer plasticizers is therefore examined. However, plasticizers are essentially VOC components (Volatile Organic Compounds), and such VOC components particularly in adhesives for use in housing are suspected to be causative substances for "New House Syndrome" ("Sick House Syndrome"). Thus, VOC problems due to plasticizers have been pointed out even in water based adhesives which apply less loads on environment. Plasticizer-free vinyl acetate polymer based emulsion adhesives have therefore been proposed, but there is no technology which can exhibit such a high adhesive strength as to be used for woodworking, and can form films even at low temperatures for example in winter.

The present applicants proposed a woodworking adhesive including a vinyl acetate polymer based emulsion, which emulsion is obtained by subjecting an ethylene-vinyl acetate copolymer based emulsion having an ethylene content of 15 to 35% by weight to seed polymerization with vinyl acetate, in the specification of Japanese Patent Application No. 9-270358. This technique can yield previously unseen excellent performances, i.e., the technique can exhibit a high adhesive strength and can form films even at low temperatures for example during wintertime without adding a plasticizer. However, even this technique has a disadvantage that a low-temperature adhesive strength when cured at low temperatures such as in winter is low. If a desired adhesive strength cannot be obtained even under such daily conditions that an adhesive is applied on an adherend and is cured at low temperatures as in winter or in cold climates, the reliability of the adhesive will be greatly lost.

As thus described, under present circumstances, there is no technique that can provide a plasticizer-free water based adhesive that has a high film-forming property at low temperatures and can positively perform adhesion operations at low temperatures. Accordingly, demands have been made to provide techniques to solve these problems, also from public viewpoints.

DISCLOSURE OF INVENTION

Accordingly, it is an object of the present invention to provide a process for producing a vinyl acetate polymer based emulsion which has satisfactory film-forming property at low temperatures and adhesive strength, even containing no plasticizer, and that can exhibit a high adhesive strength (low-temperature adhesive strength) even when cured at low temperatures, and to provide a water based adhesive including the vinyl acetate polymer based emulsion having the satisfactory performances.

After multiphasic investigations on, for example, polymerization, processing, and modification (improvement) techniques of vinyl acetate polymer based emulsions to achieve the above objects, the present inventors found the following findings. Specifically, they found that in the production of a vinyl acetate polymer based emulsion by subjecting vinyl acetate to seed polymerization in an ethylene-vinyl acetate copolymer based emulsion, the addition of a small amount of butyl acrylate (BA) to a system prior to a step of performing seed polymerization while adding vinyl acetate to the ethylene-vinyl acetate copolymer based emulsion resolves the phenomenon that adhesive strengths when cured at low temperatures are markedly decreased as seen in conventional vinyl acetate polymer based emulsions.

In addition, the same operations and advantages as above were obtained when butyl acrylate was added to a system subsequent to the step of performing seed polymerization while adding vinyl acetate to the ethylene-vinyl acetate copolymer based emulsion. The operations and advantages were supposed to be due to the action of a butyl acrylate homopolymer as a polymer plasticizer. A similar test was then performed using butyl methacrylate (BMA) instead of the butyl acrylate, and the present applicants found that low-temperature adhesive strength when cured at low temperatures was maintained at a high level also in this case. The butyl methacrylate has relatively high film-forming temperature and glass transition temperature of its homopolymer, and is not expected to serve or act as a polymer plasticizer.

In contrast, the aforementioned operations and advantages were not obtained when seed polymerization was performed while adding a mixture containing vinyl acetate and BA or BMA to a system (i.e., a conventional copolymerization procedure). In these results, a first wonder is that the aforementioned operations and advantages are obtained not when a mixture of vinyl acetate and BA or the like is added to the system but when BA or the like is, independently from vinyl acetate, added and incorporated into the system and is subjected to polymerization prior to or subsequent to the step of performing seed polymerization while adding vinyl acetate to the system. A second wonder is that similar operations and advantages can be obtained both in BA which is a soft monomer whose polymer is capable of forming a film at low temperatures, and in BMA which is a hard monomer whose polymer is not capable of forming a film at low temperatures.

The present invention has been accomplished based on these findings and further investigations on the type and amount of a polymerizable unsaturated monomer added to the system.

Specifically, the present invention provides a process for producing a vinyl acetate polymer based emulsion by seed polymerization of vinyl acetate in an ethylene-vinyl acetate copolymer based emulsion to yield a vinyl acetate polymer based emulsion. This process includes a step of performing seed polymerization while adding vinyl acetate to a system, and, prior to or subsequent to the step, a step of adding a polymerizable unsaturated monomer other than vinyl acetate to the system.

According to this production process, when the obtained emulsion is used as an adhesive, the resulting adhesive can yield satisfactory low-temperature film-forming property, adhesion, adhesive strength and adhesion workability even containing no plasticizer, and can prevent a problem of conventional technologies, i.e., the phenomenon that low-temperature adhesive strength when cured at low temperatures is remarkably decreased.

In the above production process, decrease in low-temperature adhesive strength when cured at low temperatures can be especially minimized when the step of adding a polymerizable unsaturated monomer other than vinyl acetate to the system is performed prior to the step of performing seed polymerization while adding vinyl acetate to the system.

The amount of the polymerizable unsaturated monomer other than vinyl acetate for use in the production process may be in a range from 0.0 5 to 10 parts by weight relative to 100 parts by weight of vinyl acetate. When the amount of the polymerizable unsaturated monomer other than vinyl acetate is within the above range, especially satisfactory low-temperature film-forming property, adhesion, adhesive strength, and adhesion workability can be obtained while minimizing or preventing the low-temperature adhesive strength when cured at low temperatures from greatly decreasing.

As the polymerizable unsaturated monomer other than vinyl acetate for use in the production process, at least one monomer selected from acrylic esters, methacrylic esters, vinyl esters, and vinyl ethers may be used. The use of this type of monomers can minimize the decrease in low-temperature adhesive strength when cured at low temperatures.

In another aspect, the present invention provides a water based adhesive which includes a vinyl acetate polymer based emulsion obtained by the production process. Such a water based adhesive exhibits a high adhesive strength even at low temperatures, and has, for examples, a retention of equal to or more than 60%, wherein retention (%)=[adhesive strength (kgf/cm$^2$) at low temperature (5° C.)/ordinary adhesive strength (kgf/cm$^2$)]×100. This water based adhesive is an adhesive based on a novel concept and has satisfactory low-temperature film-forming property, adhesion, adhesive strength and adhesion workability even containing no plasticizer, and can prevent a problem of conventional technologies, i.e., the phenomenon that low-temperature adhesive strength when cured at low temperatures is remarkably decreased.

A preferred water based adhesive includes substantially no plasticizer (volatile plasticizer) such as phthalic esters. This water based adhesive is especially useful as an adhesive for woodworking.

The term "seed polymerization" in the present specification is used in a wide meaning including polymerization of a monomer in a polymer emulsion. The terms "acrylic" and "methacrylic" may be collectively referred to as "(meth) acrylic".

BEST MODE FOR CARRYING OUT THE INVENTION

According to the present invention, an ethylene-vinyl acetate copolymer based emulsion is used as a seed emulsion. Ethylene-vinyl acetate copolymers constituting the emulsion generally include, but are not limited to, copolymers each having an ethylene content of 5 to 40% by weight. Among them, copolymers each having an ethylene content of 15 to 35% by weight can provide especially low film-forming temperatures and have satisfactory adhesive strengths, and are desirable. Such ethylene-vinyl acetate copolymer based emulsions are now widely on the market and are easily commercially available. The ethylene-vinyl acetate copolymer based emulsion is diluted with water prior to use, where necessary.

The amount of the ethylene-vinyl acetate copolymer is, for example, about 3 to 40% by weight, preferably about 5 to 30% by weight, and more preferably about 10 to 25% by weight, as a content in the total polymers (total solid contents) of the resulting vinyl acetate polymer based emulsion.

The seed polymerization is performed in a water based emulsion containing the ethylene-vinyl acetate copolymer based emulsion and, preferably, polyvinyl alcohol (PVA) as a protective colloid, in the presence of a polymerization initiator.

When polyvinyl alcohol is incorporated in a polymerization system, the polyvinyl alcohol acts as an emulsifier in seed polymerization, and the resulting adhesive has an improved workability in application and a higher adhesive strength.

The polyvinyl alcohol includes, but is not limited to, polyvinyl alcohols for general use in the preparation of vinyl acetate polymer based emulsions and ethylene-vinyl acetate copolymer based emulsions, and may be modified polyvinyl alcohols such as acetoacetylated polyvinyl alcohol. The polyvinyl alcohol may be either partially saponified polyvinyl alcohol or completely saponified polyvinyl alcohol. Two or more of polyvinyl alcohols having different molecular weights or different degrees of saponification can be used in combination.

The amount of the polyvinyl alcohol can be appropriately selected within a range not adversely affecting polymerization property in seed polymerization and adhesive property as an adhesive, and is generally, for example, about 2 to 40% by weight, preferably about 5 to 30% by weight, and more preferably about 8 to 25% by weight as a content in the total polymers (total solid contents) of the resulting vinyl acetate polymer based emulsion.

The system may further comprise protective colloids other than polyvinyl alcohol, and surfactants (e.g., nonionic surfactants, anionic surfactants, and cationic surfactants) within a range not adversely affecting the polymerization property and performances as an adhesive.

The polymerization initiator includes, but is not limited to, conventional initiators such as hydrogen peroxide, benzoyl peroxide, and other organic peroxides, ammonium persulfate, potassium persulfate, sodium persulfate, and azobisisobutyronitrile. These initiators can also be used as redox initiators in combination with reducing agents such as tartaric acid, Rongalit, sodium bisulfite, and ascorbic acid. The amount of the polymerization initiator is, for example, about 0.05 to 2 parts by weight relative to 100 parts by weight of the total weight of monomers (vinyl acetate, and polymerizable unsaturated monomers other than vinyl acetate) When a redox initiator is employed, the proportion of the reducing agent can be appropriately set depending on, for example, the type of the initiator. In this connection, a small portion of an organic solvent such as isopropanol, dodecyl mercaptan may be added to the system as a chain transfer agent.

A main feature of the invented production process is to include a step of performing seed polymerization while adding vinyl acetate to a system (hereinafter simply referred to as "Step A"), and prior to or subsequent to the aforementioned step, a step of adding a polymerizable unsaturated monomer other than vinyl acetate (hereinafter simply referred to as "additional monomer") to the system (hereinafter simply referred to as "Step B").

In the Step A, vinyl acetate may be added in a batch manner, continuous manner or intermittent manner, of which continuous addition or intermittent addition is preferred from viewpoints of, for example, the easiness in reaction control. The vinyl acetate may be mixed and emulsified with an aqueous solution of a protective colloid such as polyvinyl alcohol prior to the addition to the system. The present invention does not inhibit the mixing of a polymerizable unsaturated monomer other than vinyl acetate to the vinyl acetate prior to the addition to the system, within a range not deteriorating reactivity and adhesive property of the resulting emulsion, as far as the process includes the step of adding a polymerizable unsaturated monomer other than vinyl acetate to the system prior to or subsequent to the step of performing seed polymerization while adding vinyl acetate to the system. The amount of the vinyl acetate for use in seed polymerization is, for example, about 10 to 90% by weight, preferably about 15 to 80% by weight, and more preferably about 40 to 75% by weight, relative to the total polymers (total solid contents) of the resulting vinyl acetate polymer based emulsion.

A polymerization temperature in the Step A is, for example, about 60° C. to 90° C., and preferably about 70° C. to 85° C.

Such polymerizable unsaturated monomers other than vinyl acetate for use in the Step B include, but are not limited to, acrylic esters, methacrylic esters, vinyl esters, vinyl ethers, aromatic vinyl compounds, unsaturated carboxylic acid amides, olefins, dienes, and unsaturated nitriles. Each of these polymerizable unsaturated monomers can be used alone or in combination.

As the acrylic esters and methacrylic esters, any of conventionally known (meth)acrylic esters can be employed. Typical examples of such (meth)acrylic esters include methyl (meth)acrylate, ethyl (meth)acrylate, propyl (meth)acrylate, butyl (meth)acrylate, hexyl (meth)acrylate, 2-ethylhexyl (meth)acrylate, octyl (meth)acrylate, isooctyl (meth)acrylate, lauryl (meth)acrylate, stearyl (meth) acrylate, and other alkyl esters of (meth) acrylic acid; hydroxyethyl (meth)acrylate, hydroxypropyl (meth) acrylate, and other hydroxyalkyl (meth)acrylates, methoxymethyl (meth)acrylate, ethoxymethyl (meth)acrylate, and other alkoxyalkyl (meth)acrylates, glycidyl (meth) acrylate, esters of (meth)acrylic acid with polyoxyethylene glycol, polyoxypropylene glycol, and other polyoxyalkylene glycols (acryloyl compounds or methacryloyl compounds each having a polyoxyalkylene structure), and other (meth) acrylic esters each having a reactive functional group.

As the vinyl esters, any of conventionally known vinyl esters other than vinyl acetate can be employed. Typical examples of such vinyl esters include, but are not limited to, vinyl formate; vinyl propionate, vinyl butyrate, vinyl caproate, vinyl caprylate, vinyl laurate, vinyl stearate, vinyl octylate, Veova 10 (trade name, produced by Shell Japan Ltd.), and other vinyl esters of $C_3$–$C_{18}$ aliphatic carboxylic acids; vinyl benzoate, and other vinyl esters of aromatic carboxylic acids.

As the vinyl ethers, any of conventionally known vinyl ethers can be employed. Typical examples of such vinyl ethers include, but are not limited to, methyl vinyl ether, ethyl vinyl ether, n-propyl vinyl ether, iso-propyl vinyl ether, n-butyl vinyl ether, sec-butyl vinyl ether, tert-butyl vinyl ether, tert-amyl vinyl ether, and other alkyl vinyl ethers.

The aromatic vinyl compounds include, for example, styrene, vinyltoluene, a-methylstyrene, N-vinylpyrrolidone, and vinylpyridine. The unsaturated carboxylic acid amides include, but are not limited to, (meth)acrylamide, N-methylolacrylamide, N-methoxymethylacrylamide, N-methoxybutylacrylamide, and other (meth)acrylamides. The olefins include, for example, ethylene, propylene, butylene, isobutylene, and pentene. The dienes include, for example, butadiene, isoprene, and chloroprene. The unsaturated nitriles include, for example, (meth)acrylonitrile.

Of these polymerizable unsaturated monomers, at least one selected from acrylic esters, methacrylic esters, vinyl esters and vinyl ethers is preferably employed. Among them, alkyl esters of (meth)acrylic acid [e.g., $C_1$–$C_8$ alkyl esters of (meth)acrylic acid, and especially $C_1$–$C_{14}$ alkyl esters of (meth)acrylic acid], and vinyl esters of $C_{3-14}$ aliphatic carboxylic acids are typically preferred, as these monomers exhibit the least decrease in low-temperature adhesive strength when cured at low temperatures. From viewpoints of the retention of satisfactory low-temperature film-forming property and transparency of formed films, in addition to low-temperature strengths thereof, more preferred monomers are $C_3$–$C_{12}$ alkyl esters of acrylic acid, and $C_2$–$C_8$ alkyl esters of methacrylic acid.

The amount of the additional monomer can be appropriately selected within a range not adversely affecting adhesive property and other performances of the emulsion, and is generally in a range from about 0.05 to 10 parts by weight relative to 100 parts by weight of vinylacetate. If the amount is less than 0.05 part by weight, the adhesive strength when cured at low temperatures (low-temperature adhesive strength) is liable to decrease, and if it exceeds 10 parts by weight, ordinary adhesive strength is liable to decrease. Of the above range, in a range of 0.1 to 7 parts by weight, and especially preferably 0.5 to 4 parts by weight relative to 100 parts by weight of vinyl acetate, the adhesive strength is satisfactory and the low-temperature adhesive strength when cured at low temperatures least decreases.

The phrase "the Step B is performed prior to the Step A" means that the additional monomer is added to the system prior to the addition of vinyl acetate for seed polymerization. In this case, the additional monomer may be added either in the presence of or in the absence of a polymerization initiator. Or equivalently, the polymerization of the additional monomer may initiate prior to the initiation of the polymerization of vinyl acetate or may initiate concurrently with the initiation of the polymerization of vinyl acetate. A two-step polymerization can be performed in which the Step A is started after the completion of the polymerization of the additional monomer [i.e., after the formation of a homopolymer (or a copolymer when two or more of the additional monomers are employed) of the additional monomer].

In contrast, the phrase "the Step B is performed subsequent to the Step A" means that the additional monomer is added to the system to subject the additional monomer to polymerization, after the completion of the addition of vinyl acetate. In this case, the additional monomer may be added after the completion of the polymerization of vinyl acetate.

According to the present invention, it is supposed that the polymerization of the additional monomer proceeds in such a state that the additional monomer occupies a large proportion of the total monomers in the system in any case that the Step B is performed prior to the Step A and that the Step B is performed subsequent to the Step A, as compared with a conventional copolymerization where seed polymerization is performed while adding a mixture of vinyl acetate and an additional monomer to the system.

The additional monomer in the Step B may be added in a batch manner, continuous manner or intermittent manner, of which an addition procedure which can add the additional monomer for a time as short as possible, such as batch addition, is preferred. The additional monomer may be mixed with an aqueous solution of a protective coloid such as polyvinyl alcohol for emulsification prior to the addition to the system. A temperature in the Step B is similar to that in the Step A. In this connection, when the Step B is performed prior to the Step A and the polymerization of the additional monomer initiates in the Step A, the temperature at the time when the additional monomer is added is not particularly limited.

According to the present invention, the decrease in low-temperature adhesive strength can be especially minimized when the step of adding a polymerizable unsaturated monomer other than vinyl acetate to the system is performed prior to the step of performing seed polymerization while adding vinyl acetate to the system.

A polymerizer is not especially limited, and normal-pressure emulsification polymerizers for daily use in the industry can be employed.

The resulting vinyl acetate polymer based emulsion obtained according to the invented process exhibits a satisfactory low-temperature film-forming property (e.g., the minimum film-forming temperature is less than 0° C.) and a high adhesive strength, even containing no plasticizer. In addition, the vinyl acetate polymer based emulsion has a feature that it can minimize marked decrease of adhesive strength when cured at low temperatures and can exhibit a high low-temperature adhesive strength. For example, the resulting aqueous emulsion has a retention represented by the following equation:

Retention (%)=[low-temperature (5° C.) adhesive strength (kgf/cm$^2$)/ordinary adhesive strength (kgf/cm$^2$)]×100 of equal to or more than 60%, and preferably equal to or more than 80%. Under some conditions, an aqueous emulsion having the retention of equal to or more than 90% can be obtained. Such an aqueous emulsion having the retention of equal to or more than 80% can be obtained, for example, by performing the step of adding a polymerizable unsaturated monomer other than vinyl acetate to the system prior to the step of performing seed polymerization while adding vinyl acetate to the system.

The term "ordinary adhesive strength" means the adhesive strength when the emulsion in question is used as an adhesive for woodworking, and is defined as the compression-shear adhesive strength measured according to Japanese Industrial Standards (JIS) K 6852. The term "low-temperature (5° C.) adhesive strength" means the adhesive strength when the aqueous emulsion is used for woodworking, and is defined as the compression-shear adhesive strength measured according to JIS K 6852, except that the emulsion and a test piece are held at 5° C. for one day, subsequently adhesion and curing procedures are performed at this temperature, and the compression-shear adhesive strength is measured at this temperature.

The vinyl acetate polymer based emulsion obtained according to the invented process also has a feature that a transparent film can be formed when the emulsion is applied to an adherend.

According to the present invention, the low-temperature adhesive strength is not decreased even when cured at low temperatures. The reason of this phenomenon is not completely clarified, but this is provably because, as described above, the polymerization of the additional monomer proceeds in such a state that the additional monomer occupies a large proportion in the total monomers in the system according to the invented process. This results in a high proportion of a formed homopolymer (or a copolymer when two or more of the additional monomers are employed) of the additional monomer or of a formed block copolymer of the additional monomer and vinyl acetate, and therefore results in a low proportion of a formed random copolymer of the additional monomer and vinyl acetate. In this connection, if the aforementioned operations and advantages are observed only in the use of an acrylic ester whose homopolymer has a lower glass transition point than that of a vinyl acetate homopolymer, the above phenomenon is supposed to be caused by that the homopolymer of the additional monomer acts as a film-forming auxiliary in a film-forming process at low temperatures, just like as a conventional plasticizer. However, this supposition does not hold, because the invention is also effective even in the use of a monomer such as butyl methacrylate whose homopolymer has a relatively high glass transition point. Accordingly, it is supposed that a complicated core-shell structure is formed under a special condition of seed polymerization using an ethylene-vinyl acetate copolymer as a seed, and this constitutes some element to yield featuring advantages such as uniformization of temperature-dependency in the formation of films.

The vinyl acetate polymer based emulsion obtained according to the invented process can be used as a water based adhesive as intact. Alternatively, such a water based adhesive may further comprise cellulose derivatives and other water-soluble polymers as thickeners, or may further comprise, for example, fillers, solvents, pigments, dyes, antiseptics, and antiformers, according to necessity. The invented water based adhesive according to a preferred embodiment includes substantially no plasticizer (volatile plasticizer). The phrase "includes (or comprises) substantially no plasticizer" means that the scope of the invention does not exclude the cases where, for example, a pigment paste to be added contains a plasticizer, and the plasticizer thereby contaminates the adhesive.

The water based adhesive thus prepared has a high adhesive strength and the adhesive strength does not decrease even when cured at low temperatures, and is advantageous as a water based adhesive for woodworking and for paperworking, especially for woodworking. The total amount of polymers in the water based adhesive is, for example, about 25 to 70% by weight, and preferably about 30 to 60% by weight on solid content basis.

When residual monomers in the vinyl acetate polymer based emulsion obtained according to the invented process are completely removed by a conventionally known technique, the resulting water based adhesive is a "VOC-free water based adhesive", and is an adhesive that provides a feeling of being safe not only for industrial use but also for schoolchildren's use and for medical use. In addition, the vinyl acetate polymer based emulsion obtained according to the invented process can be used in not only adhesives but also paint bases, coating agents, and other various applications.

The invented production process can produce a vinyl acetate polymer based emulsion which has satisfactory low-temperature film-forming property and adhesive strength even containing no plasticizer, and whose adhesive strength (low-temperature adhesive strength) does not decrease even when cured at low temperatures.

In addition and advantageously, the invented water based adhesive can exhibit, even containing no plasticizer, a satisfactory low-temperature film-forming property and adhesive strength, and has a high adhesive strength even when cured at low temperatures.

The present invention will be illustrated in further detail with reference to several examples below, which are not intended to limit the scope of the invention. The physical properties of vinyl acetate polymer based emulsions obtained according to individual examples were tested by the following methods.

(Minimum Film-forming Temperature)

The minimum film-forming temperature was determined according to JIS K 6804 (7.6: "Minimum film-forming temperature") using a film-forming tester.

(Viscosity)

Using a BH type viscometer, the viscosity was determined under conditions of 23° C. and 10 rpm.

(Ordinary Adhesive Strength)

The compression-shear adhesive strength when the obtained emulsion was used as an adhesive for woodworking was determined. The test was carried out according to JIS K 6852 using a combination of a birch-birch as a test piece. The state of failure in the adherend was checked, and the ratio of the area of failure portions to the shear area was defined as the material failure rate (%)

(Low-temperature Adhesive Strength)

The compression-shear adhesive strength was determined in the same manner as in the ordinary adhesive strength, except that the emulsion to be tested and a test piece were held at 5° C. for one day for cooling, and adhesion and curing procedures were performed at 5° C., and the compression-shear adhesive strength was determined at 5° C. The state of failure in the adherend was checked, and the ratio of the area of failure portions to the shear area was defined as the material failure rate (%)

(Transparency of Film)

The obtained emulsion was applied to a thickness of 100 µm onto a glass plate in an atmosphere of 23° C. and 50% relative humidity (RH) and was cured for one day to form a film. The transparency of this film was visually inspected according to the following criteria.

○: Nearly transparent

Δ: Hazed

×: Completely opaque

EXAMPLE 1

In a reactor with a stirrer, a reflux condenser, dropping funnels, and a thermometer, 505 parts by weight of water was placed, in which 55 parts by weight of polyvinyl alcohol (PVA) (produced by Kuraray Co., Ltd. under the trade name "Kuraray Poval PVA 224") and 0.7 part by weight of tartaric acid were dissolved and the resulting solution was held at 80° C. After PVA was completely dissolved, 125 parts by weight of an ethylene-vinyl acetate copolymer emulsion (EVA emulsion) (produced by Denki Kagaku Kogyo Kabushiki Kaisha under the trade name "Denka Supertex NS 100"; solids concentration: 55% by weight) was added to the solution. After the solution was raised in temperature up to 80° C., 6 parts by weight of n-butyl acrylate (BA) was added and the resulting mixture was stirred for 5 minutes. To the resulting mixture, a catalyst (an aqueous solution of 1 part by weight of a 35% by weight hydrogen peroxide aqueous solution dissolved in 22 parts by weight of water) and 285 parts by weight of vinyl acetate monomer were continuously added dropwise from different dropping funnels over 2 hours. After the completion of the addition, the resulting mixture was stirred for further 1.5 hours to complete the polymerization to thereby yield a vinyl acetate polymer based emulsion.

EXAMPLE 2

A vinyl acetate polymer based emulsion was prepared in the same manner as in Example 1, except that 9 parts by weight of n-butyl methacrylate (BMA) was used as the additional monomer instead of BA.

EXAMPLE 3

A vinyl acetate polymer based emulsion was prepared in the same manner as in Example 1, except that 12 parts by weight of lauryl acrylate (LA) was used as the additional monomer instead of BA.

EXAMPLE 4

A vinyl acetate polymer based emulsion was prepared in the same manner as in Example 1, except that 12 parts by weight of 2-ethylhexyl methacrylate (2EHMA) was used as the additional monomer instead of BA.

EXAMPLE 5

A vinyl acetate polymer based emulsion was prepared in the same manner as in Example 1, except that 12 parts by weight of vinyl laurate (VL) was used as the additional monomer instead of BA.

EXAMPLE 6

A vinyl acetate polymer based emulsion was prepared in the same manner as in Example 1, except that 125 parts by weight of "Sumikaflex 401" (produced by Sumitomo Chemical Industries, Co., Ltd. under the trade name "S-401"; solids concentration: 55% by weight) was used as the EVA emulsion instead of NS100.

EXAMPLE 7

A vinyl acetate polymer based emulsion was prepared in the same manner as in Example 1, except that 125 parts by weight of "Airflex 401" (A-401, produced by Airproduct Co., Ltd.; solids concentration: 55% by weight) was used as the EVA emulsion instead of NS100.

EXAMPLE 8

In a reactor with a stirrer, a reflux condenser, dropping funnels, and a thermometer, 505 parts by weight of water was placed, in which 55 parts by weight of PVA (PVA 224, produced by Kuraray Co., Ltd.) and 0.7 part by weight of tartaric acid were dissolved and the resulting solution was held at 80° C. After PVA was completely dissolved, 125 parts by weight of an EVA emulsion (produced by Denki Kagaku Kogyo Kabushiki Kaisha under the trade name "Denka Supertex NS 100"; solids concentration: 55% by weight) was added to the solution. After the solution was raised in temperature up to 80° C., 6 parts by weight of BA was added. To the resulting mixture, a catalyst (an aqueous solution of 0.3 part by weight of a 35% by weight hydrogen peroxide aqueous solution dissolved in 7 parts by weight of water) was continuously added dropwise from a dropping funnel over 30 minutes to complete the polymerization. Subsequently, a catalyst (an aqueous solution of 0.7 part by weight of a 35% by weight hydrogen peroxide aqueous solution in 15 parts by weight of water) and 285 parts by weight of vinyl acetate monomer were continuously added dropwise to the resulting mixture from different dropping funnels over 2 hours. After the completion of the addition, the resulting mixture was stirred for further 1.5 hours to complete the polymerization to thereby yield a vinyl acetate polymer based emulsion.

EXAMPLE 9

In a reactor with a stirrer, a reflux condenser, dropping funnels, and a thermometer, 505 parts by weight of water was placed, in which 55 parts by weight of PVA (produced by Kuraray Co., Ltd., PVA 224) and 0.7 part by weight of tartaric acid were dissolved and the resulting solution was held at 80° C. After PVA was completely dissolved, 125 parts by weight of an EVA emulsion (produced by Denki Kagaku Kogyo Kabushiki Kaisha under the trade name "Denka Supertex NS 100"; solids concentration: 55% by weight) was added to the solution. After the solution was raised in temperature up to 80° C., a catalyst (an aqueous solution of 1 part by weight of a 35% by weight hydrogen peroxide aqueous solution in 22 parts by weight of water) and 285 parts by weight of vinyl acetate monomer were continuously added dropwise to the solution from different dropping funnels over 2 hours. After the completion of the addition, 6 parts by weight of BA was added to the mixture, and the resulting mixture was stirred for further 1.5 hours to complete the polymerization to thereby yield a vinyl acetate polymer based emulsion.

Compatative Example 1

A vinyl acetate polymer based emulsion was prepared in the same manner as in Example 1, except that BA was not added.

Comparative Example 2

A vinyl acetate polymer based emulsion was prepared in the same manner as in Example 1, except that a mixture containing BA dissolved in vinyl acetate monomer was added dropwise to the reactor, instead of the dropwise addition of BA to the reactor prior to the addition of vinyl acetate monomer.

Reference Example 1

A commercially available vinyl acetate polymer based emulsion (manufactured by Konishi Co., Ltd., a ho mopolyvinyl acetate based emulsion) containing 10% by weight of dibutyl phthalate (plasticizer) based on the total weight of polymers was employed as Reference Example 1.

The physical properties of the vinyl acetate polymer based emulsions prepared according to the examples, comparative examples, and reference example were determined. The results are shown in Table 1. In the table, the retentions were values obtained according to the aforementioned equation.

TABLE 1

| | | Ex. 1 | Ex. 2 | Ex. 3 | Ex. 4 | Ex. 5 | Ex. 6 | Ex. 7 | Ex. 8 | Ex. 9 | Com. Ex. 1 | Com. Ex. 2 | Ref. Ex. 1 |
|---|---|---|---|---|---|---|---|---|---|---|---|---|---|
| Composition of polymerization (part by weight) | Water | 505 | 505 | 505 | 505 | 505 | 505 | 505 | 505 | 505 | 505 | 505 | |
| | Tartaric acid | 0.7 | 0.7 | 0.7 | 0.7 | 0.7 | 0.7 | 0.7 | 0.7 | 0.7 | 0.7 | 0.7 | |
| | PVA 224 | 55 | 55 | 55 | 55 | 55 | 55 | 55 | 55 | 55 | 55 | 55 | |
| | EVA emulsion | 125 NS100 | 125 NS100 | 125 NS100 | 125 NS100 | 125 NS100 | 125 S-401 | 125 A-401 | 125 NS100 | 125 NS100 | 125 NS100 | 125 NS100 | |
| | Additional monomer | BA | BMA | LA | 2EHMA | VL | BA | BA | BA | BA | — | BA | — |
| | Amount of Monomer | 6 | 9 | 12 | 12 | 12 | 6 | 6 | 6 | 6 | — | 6 | |
| | Vinyl acetate monomer | 285 | 285 | 285 | 285 | 285 | 285 | 285 | 285 | 285 | 285 | 285 | |
| | Catalyst (solution) | 23 | 23 | 23 | 23 | 23 | 23 | 23 | 23 | 23 | 23 | 23 | |
| Adding manner of monomer other than vinyl acetate* | | A | A | A | A | A | A | A | B | C | not added | D | — |
| Minimum film-forming temperature (° C.) | | <0 | <0 | <0 | <0 | <0 | <0 | <0 | <0 | <0 | <0 | <0 | 0 |
| Viscosity (Pa · s) | | 55.0 | 56.0 | 56.0 | 55.0 | 55.0 | 54.0 | 54.0 | 54.0 | 56.0 | 54.0 | 55.0 | 52.0 |
| Ordinary adhesive strength (kgf/cm$^2$) | | 210 | 200 | 205 | 190 | 210 | 210 | 210 | 210 | 210 | 195 | 190 | 200 |
| Material failure rate (%) | | 50 | 50 | 45 | 45 | 50 | 50 | 50 | 50 | 50 | 50 | 50 | 40 |
| Low-temperature adhesive strength (kgf/cm$^2$) | | 200 | 160 | 164 | 152 | 147 | 200 | 195 | 200 | 147 | 100 | 95 | 170 |
| Material failure rate (%) | | 50 | 40 | 40 | 40 | 40 | 50 | 50 | 50 | 30 | 20 | 20 | 40 |
| Retention (%) | | 95 | 85 | 80 | 80 | 75 | 95 | 93 | 95 | 75 | 51 | 50 | 85 |
| Transparency | | ○ | ○ | ○ | ○ | ○ | ○ | ○ | ○ | ○ | X | Δ | ○ |

*A: added in a batch manner prior to the addition of vinyl acetate,
B: polymerized prior to the addition of vinyl acetate
C: added in a batch manner subsequent to the addition of vinyl acetate,
D: added dropwise as a mixture with vinyl acetate Table 1 shows that the vinyl acetate polymer based emulsions according to the examples had low minimum film-forming temperatures and exhibited equivalent performances in adhesive strength even though they contained no plasticizer, as compared with the commercially available plasticizer-containing vinyl acetate polymer based emulsion (Reference Example 1). In contract, the vinyl acetate polymer based emulsions according to the comparative examples showed markedly deteriorated low-temperature adhesive strengths and retentions as compared with the vinyl acetate polymer based emulsions according to the examples, although the former had low minimum film-forming temperatures as in the examples.

What is claimed is:

1. A process for producing a vinyl acetate polymer based emulsion by seed polymerization of vinyl acetate in an ethylene-vinyl acetate copolymer based emulsion, said process comprising a step of adding a polymerizable unsaturated monomer other than vinyl acetate to a system prior to a step of performing seed polymerization while adding vinyl acetate to the system.

2. A process for producing a vinyl acetate polymer based emulsion according to claim 1, wherein the amount of the polymerizable unsaturated monomer other than vinyl acetate is in a range from 0.05 to 10 parts by weight relative to 100 parts by weight of vinyl acetate.

3. A process for producing a vinyl acetate polymer based emulsion by seed polymerization of vinyl acetate in an ethylene-vinyl acetate copolymer based emulsion, said process comprising a step of performing seed polymerization while adding vinyl acetate to a system, and, prior to or subsequent to said step, a step of adding a polymerizable unsaturated monomer other than vinyl acetate to the system, wherein at least one monomer selected from acrylic esters, methacrylic esters, vinyl esters, and vinyl ethers is used as the polymerizable unsaturated monomer other than vinyl acetate.

4. A water based adhesive comprising a vinyl acetate polymer based emulsion obtained by a process for producing a vinyl acetate polymer based emulsion by seed polymerization of vinyl acetate in an ethylene-vinyl acetate copolymer based emulsion, said process comprising a step of performing seed polymerization while adding vinyl acetate to a system, and, prior to or subsequent to said step, a step of adding at least one polymerizable unsaturated monomer selected from the group consisting of acrylic esters, methacrylic esters, vinyl esters, and vinyl ethers to the system, wherein the adhesive has an ordinary adhesive strength of 190 kgf/cm$^2$ or greater, and has a retention of 60% or greater, where the retention (%)=(low-temperature at 5° C. adhesive strength (kgf/cm$^2$)/ordinary adhesive strength (kgf/cm$^2$)× 100).

5. A water based adhesive according to claim comprising substantially no plasticizer.

6. A water based adhesive according to claim 4 or 5, which is for use in woodworking.

* * * * *